Oct. 6, 1925.
C. F. LEONARD
1,556,229
STABILIZER FOR TWO-WHEEL VEHICLES
Filed Dec. 13, 1922    2 Sheets-Sheet 2
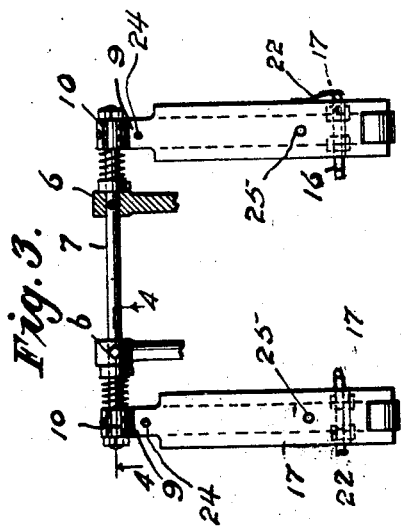
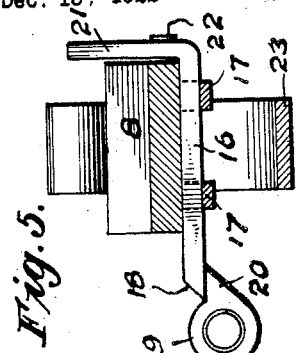
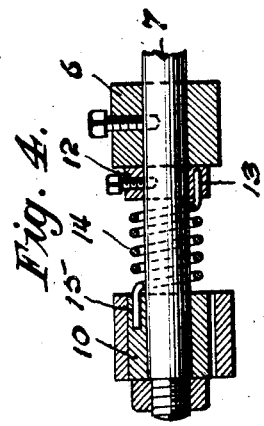
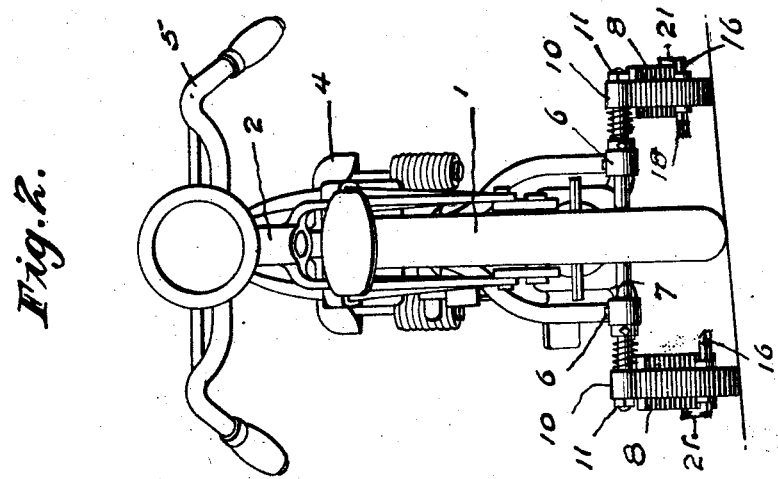
Inventor
Charles F. Leonard.
By
Attorney Patented Oct. 6, 1925.

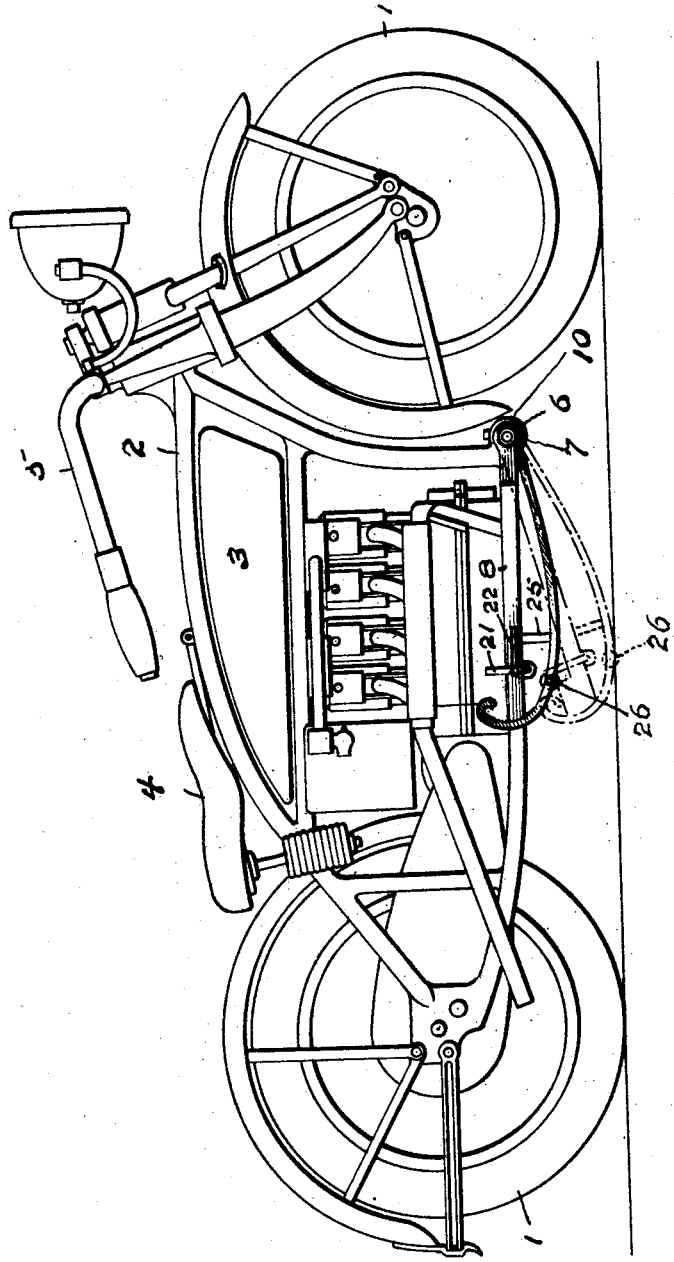

1,556,229

UNITED STATES PATENT OFFICE.

CHARLES F. LEONARD, OF THE UNITED STATES ARMY.

STABILIZER FOR TWO-WHEEL VEHICLES.

Application filed December 13, 1922. Serial No. 606,698.

*To all whom it may concern:*

Be it known that I, CHARLES F. LEONARD, lieutenant colonel, 13th Infantry, a citizen of the United States, residing at Camp Devens, Mass., have invented an Improved Stabilizer for Two-Wheel Vehicles, of which the following is a specification.

This invention relates to stabilizers for vehicles, and is more especially adapted for use on two-wheel vehicles, such as motorcycles, bicycles, or the like, wherein equilibrium is, under many conditions, very difficult to maintain.

This invention provides means whereby ordinary foot-boards of a motorcycle may be replaced by foot-boards and steel runners, which will admit of being dropped and brought into contact with the ground; said device providing a substitute for the usual practice of dropping the feet on the ground to retard progress or maintain the machine in an upright position.

An object of the invention is to provide a simple, durable and inexpensive attachment for motorcycles, that may be used as regular equipment, or can be applied to the present machine.

Another object is to provide a device that does not alter the general appearance of the machine, and that may be applied to the present motorcycle without change.

Another object is to provide a steadying medium for a motorcycle, for use when traveling at a very slow rate of speed, as in congested districts, or when starting.

A further object is to provide a stabilizer suitable for use on surfaces of various irregularities and various surface materials.

These and other objects will appear in the following description and drawings, and will be finally pointed out in the appended claims.

Similar numerals indicate corresponding parts in all the figures of the drawings in which, Fig. 1 is a side elevation of a motorcycle, showing the improved stabilizer applied thereto, said attachment being shown in full lines in its traveling or inoperative position, and by dotted lines in its operative or stabilizing position.

Fig. 2 is a front view of a motorcycle, with the improved attachment, in its applied position on both sides of the machine, the application of the stabilizers being made on different levels, or on irregular ground.

Fig. 3 is a plan view of the improved stabilizer removed from the machine.

Fig. 4 is an enlarged section through the forward end of one of the stabilizers on line 4—4 of Fig. 3.

Fig. 5 is a detail sectional view on a line with the latch.

With the present solo motorcycle, it is impossible to ride with safety in sand, mud, gravel, or on other loose or unstable surfaces. It is also very dangerous to ride on hard surfaces that are covered with ice, a thin coating of mud, water, or other substance that renders rubber tires uneffective for traction purposes. Again it is very difficult to operate a machine of this character through congested traffic, such as is found in cities admitting only very slow progress, and no progress laterally in which equilibrium may be maintained.

Without going into the causes, it will be sufficient to state that when operating a motorcycle on the surfaces mentioned, serious "spills" are imminent at all times; that the present universal method used by operators to meet such an emergency is to extend either one or both of his feet in an effort to form a side support and avoid accident.

Said method is very dangerous in many ways, among which may be mentioned when the operator uses his leg as a prop, it is necessary to extend his foot, or feet, beyond the foot-boards, thus placing same in the way of an on-coming vehicle, or if he is very close to another vehicle, he must choose between falling against the vehicle, or placing his leg in its path, with equally dangerous results, especially when the vehicles are traveling at high speed. If the surface on which the operator is compelled to place his foot be obstructed, or of a character that will not permit the slipping of the foot, serious damage may be the result.

Therefore, to provide a successful stabilizer, it is desirable to have slidable props on both sides of the machine, that when in use do not increase the width of the machine, that can be extended instantaneously, will be automatically retracted, and will not alter the appearance of the machine.

This invention not only meets all of the above requirements, but it also provides a very effective brake, as well as means whereby the machine may be held in a vertical position, on uneven ground, with the engine running, the machine stationary, and everything in readiness for a quick start, thus providing all the benefits of a two-wheel vehicle having the stability of a three-wheel vehicle when necessary.

Referring to the drawings by numerals, 1 indicates the wheels, 2 the frame, 3 the fuel tank, 4 the seat, and 5 the handle or steering bar, of a conventional form of motorcycle.

The modern vehicles of this character at present are provided with sockets or brackets 6, in which the forward shaft of a side-car may be mounted, and it is in these brackets that the present stabilizer is mounted, and consists of the forward supporting bar 7 rigidly clamped in brackets 6 arranged on the frame 2 immediately in rear of the front wheel.

The footboards 8 are secured to steel runners 23, pivotally mounted on the ends of bar 7, and are secured thereon by retaining nuts, threaded on the outer ends of said rod.

An adjustable washer 12 is rigidly secured to the shaft 7, and is provided with a perforation 13, in which one end of a coil spring 14 is seated. The opposite end of said coil spring 14 is mounted in the enlarged portion 10 of the foot-board as seen at 15, (Fig. 4) and is adapted to normally raise the rear end of the foot-board into its horizontal or elevated position. The washer 12 may be adjusted on the shaft 7 to increase or diminish the tension or lift on the rear end of the foot-board.

As above described, the foot-board has the appearance of, and functions in a manner similar to, the usual foot-board, on which the operator rests his foot.

Near the rear end of the improved foot-board, which may be depressed at will by the operator, are means for locking same in its elevated position, consisting of a spring pressed bolt or latch 16, adapted to slide in keepers or guides 17, mounted on the under face of the board. Said latch has a beveled inner end 18, adapted to come into contact with a retaining member 19, having a coacting beveled lug 20, mounted on a convenient part of the frame of the motorcycle over which the latch engages to retain the board in its horizontal position, irrespective of the weight placed thereon.

The latch 16 is provided with an upwardly extending outer end 21, so arranged as to extend above the upper surface of the board and is adapted to be engaged by the heel of the operator to withdraw the latch from above lug 20, and permit the rear end of the board to be depressed. A leaf spring 22 mounted on the edge of the foot-board is adapted to retain the latch in its lug engaging position, with the extension 21 against the outer edge of the foot-board which acts as a stop.

The runners, as seen at 23, are pivotally mounted on bar 7 at their forward ends and extend beneath and around the rear ends of the foot boards in such a way as to permit a flexible or cushioned contact with the ground. The footboard is fastened to the runner at its forward end by a bolt. A post 25 is used to fasten the foot-board to the rear end of the runner. A roller 26 may, if preferred, be so located in the runner as to make first contact with the surface of the ground as the foot-board is depressed.

As shown, the runner is approximately ski-shaped, and presents a curved surface to the ground under all pressures. In this form and manner of mounting, the runner is drawn over the surface owing to its being secured at its forward end, and is also adapted to make a rolling, light contact with the ground, to maintain an upright position of the machine at low speed, on hard ground. Should the surface be soft, the roller will sink in and the runner come into contact with the surface.

As the downward pressure on the board is increased, the runner flattens out and the friction is correspondingly increased. Should the surface be sand, mud, or other very soft substance, the runner may sink in and the underneath surface of the board come into contact with the said surface.

The rollers in the runners are not an essential part of this invention, and are added simply to enable starting or movement at a low speed, with the minimum noise, and without unnecessary wear to the runners. Again the rollers may be found especially effective on hard surfaces covered with ice, to prevent skidding.

Briefly, every contingency met with is provided for in the stabilizer here shown.

Independent action of the boards provides for separate operation, the operation of only one, and on different levels of surface on opposite sides of the machine.

The stabilizer will ride without hazard over abrupt as well as gradual irregularities in the road, for the reason that the forward end is never depressed, remains at the normal level of the foot-board, and will drag safely over any surface that the frame of the machine will clear.

Provision is made, not only for all forms of irregularities in the road, but all varieties of materials going to make up the surface of same, such as hard surfaces, or the same covered with ice, hard surfaces covered with a layer of unstable substance, such as snow, sand, water, mud, or the like, as well as a road-bed of deep sand, mud, or other soft or yielding surface, having no hard or solid foundation which may be reached by displacing the surface material.

When said last mentioned surfaces are encountered, certain parts of the stabilizer function to bring about the same result that other parts of the stabilizer perform when the immediate surface is hard, or is covered with a layer of material through which the parts may reach a solid surface.

When it is necessary for any reason to operate the stabilizer, the operator must simply throw the heel outwardlly and release the latch, when the stabilizer may be forced down into contact with the road. By removing the pressure of the foot of the operator, the board is automatically forced up into its normal position and is retained therein by the latch. There is no extension beyond the normal width of the machine during or after the application of the stabilizer.

Having thus described my invention, what I claim as new and desire to secure by Letters Patent is:

1. A stabilizer for motorcycles, comprising runners carrying footboards one or both of which adapted to be brought into contact with the ground, means for retracting the boards and runners, and means for retaining the boards in their retracted position.

2. A stabilizer for motorcycles, comprising runners carrying footboards on opposite sides of the motorcycle, said runners alone and said runners and footboards adapted to be brought into contact with the ground, means for retracting the boards and runners, and means for retaining the boards and runners in their retracted position.

3. A stabilizer for motorcycles, comprising runners carrying footboards on opposite sides of the motorcycle, said runners and boards adapted to be brought into contact with the ground at different levels, means for retracting the boards and runners, and means for retaining the boards and runners in their retracted position.

4. A stabilizer for motorcycles, comprising runners carrying footboards on opposite sides of the motorcycle, said runners adapted to be brought into contact with the ground simultaneously followed by contact of either footboard, means for retracting the boards, and means for retaining the boards in their retracted position.

5. A stabilizer for motorcycles, comprising runners carrying footboards on opposite sides of the motorcycle, said runners adapted to be brought into contact with the ground independently and at different elevations followed by contact of either footboard, means for retracting the boards, and means for retaining the boards in their retracted position.

6. A stabiliber for motorcycles, comprising runners carrying footboards pivotally supported at their forward ends, said runners and footboards adapted to be brought into contact with the ground at their rear ends, means for retracting the boards, and means for retaining the boards in their retracted position.

7. A stabilizer for motorcycles, comprising runners carrying footboards said runners and footboards adapted to be tilted into contact with the ground, respectively, means for retracting the boards, and means for retaining the boards in their retracted position.

8. A stabilizer for motorcycles, comprising runners carrying footboards said runners and footboards adapted to be tilted into contact with the ground at their rear ends only, means for retracting the boards, and means for retaining the boards in their retracted position.

9. A stabilizer for motorcycles, comprising footboards having flexible runners, adapted to be brought into contact with the ground, means for retracting the boards, and means for retaining the boards in their retracted position.

10. A stabilizer for motorcycles, comprising footboards having flexible runners adapted to provide progressively increasing surfaces, adapted to be brought into contact with the surface of the road by an increase of pressure, means for retracting the boards, and means for retaining the boards in their retracted position.

11. A stabilizer for motorcycles, comprising tilting footboards, and flexible runners having various surfaces adapted to be brought into contact with various surfaces of road bed, means for retracting the boards and runners, and means for retaining same in their retracted position.

12. A stabilizer for motorcycles, comprising tilting footboards and runners, mounted at their forward ends on the motorcycle, and adapted to drag at their rear ends to maintain equilibrium and retard progress of the machine.

13. A stabilizer for motorcycles, comprising tilting footboards and runners, independently mounted at their forward ends on the motorcycle, and adapted to drag at their rear ends to maintain equilibrium and retard progress of the machine.

14. A stabilizer for motorcycles, comprising tilting footboards and runners, independently mounted at their forward ends on the motorcycle, and adapted to be forced into contact with the ground by the operator, coil springs secured to the boards and a stationary part of the motorcycle to lift the boards, and means for retaining the boards in their elevated position.

15. A stabilizer for motorcycles, comprising tilting foot-boards and flexible runners, independently mounted at their forward ends on the motorcycle, and adapted to be forced into contact with the ground by the foot of the operator, coil springs adapted to lift the rear end of the boards, and means for retaining the boards in their elevated position.

16. A stabilizer for motorcycles, comprising foot-boards and runners adapted to be depressed at their rear ends into contact with the surface of the road, coil springs at the forward ends of the boards for lifting the boards into their normal position, and means for securing the boards in said position.

17. A stabilizer for motorcycles, comprising foot-boards adapted to be depressed at their rear ends into contact with the surface of the road, means for normally holding the boards out of contact with the road, and automatic locking means for securing the boards in their elevated position.

18. A stabilizer for motorcycles, comprising foot-boards adapted to be depressed at their rear ends into contact with the surface of the road, means for normally holding the boards out of contact with the road, automatic locking means for securing the boards in their elevated position, and manually operated means for releasing same.

19. A stabilizer for motorcycles, comprising foot-boards adapted to be depressed at their rear ends into contact with the surface of the road, means for normally holding the boards out of contact with the road, a spring pressed latch adapted to engage a part of the motorcycle to hold the board in its normal position, and means for withdrawing said latch.

20. A stabilizer for motorcycles, comprising foot-boards adapted to be depressed at their rear ends into contact with the surface of the road, means for normally holding the boards out of contact with the road, a spring pressed latch adapted to engage a part of the motorcycle to hold the board in its normal position, and having an upward extension for engagement by the foot of the operator to disengage the latch.

21. An attachment for motorcycles, consisting of a shaft rigidly mounted on the frame of the machine, foot-boards pivotally mounted on the shaft at their forward ends on opposite sides of the machine, flexible shoes having antifriction rollers secured beneath the boards and adapted to contact with the ground when the rear end of the board is depressed, coil springs mounted at one end in the forward end of the boards and at their opposite ends in adjustable washers mounted on the shaft, laterally slidable spring pressed latches mounted near the rear ends of the boards having beveled inner ends, retaining member having beveled lugs adapted to coact with the beveled ends of the latches, to cause said members to be automatically engaged to retain the rear ends of the boards when lifted by said coil springs, and extensions on the latches for engagement of the heel of the operator to release the rear ends of the boards.

CHARLES F. LEONARD.